Dec. 24, 1968   R. A. NANCE ET AL   3,417,610
AUTOMATIC ULTRASONIC RAILROAD WHEEL INSPECTION SYSTEM
Filed Dec. 29, 1965
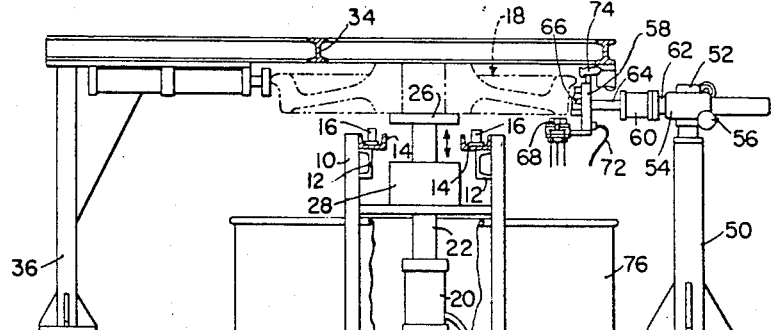
Fig.1
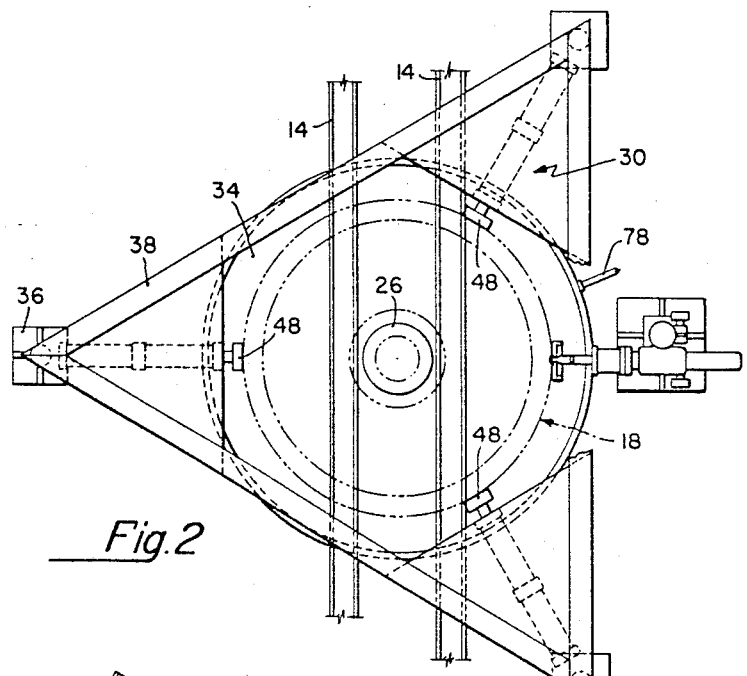
Fig.2
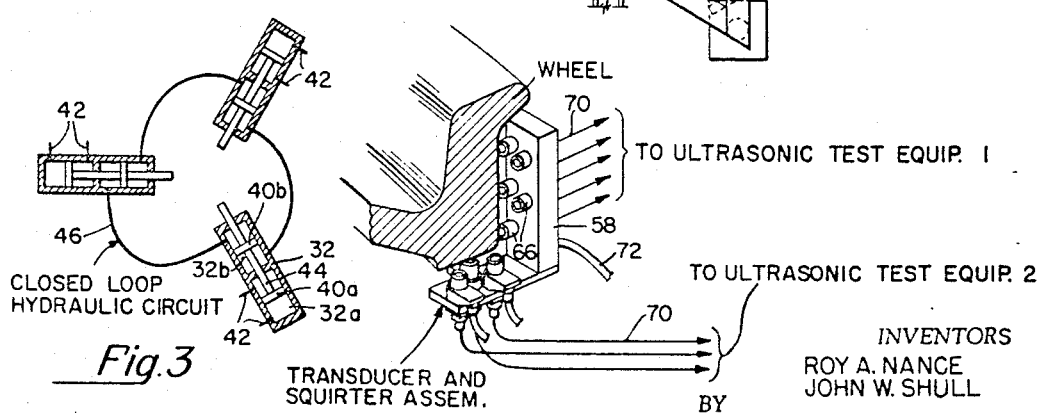
Fig.3
Fig.4
INVENTORS
ROY A. NANCE
JOHN W. SHULL
BY
ATTORNEY

United States Patent Office 3,417,610
Patented Dec. 24, 1968

3,417,610
AUTOMATIC ULTRASONIC RAILROAD WHEEL INSPECTION SYSTEM
Roy A. Nance, Malvern, and John W. Shull, West Grove, Pa., assignors, by mesne assignments, to Automation Industries, Inc., a corporation of California
Filed Dec. 29, 1965, Ser. No. 517,363
4 Claims. (Cl. 73—67.7)

ABSTRACT OF THE DISCLOSURE

An automatic ultrasonic wheel inspection system forming a station on a conveyor line wherein a turntable on a piston automatically raises a railroad wheel from the conveyor and centers the wheel on the turntable. An ultrasonic transducer and squirter assembly is positioned at the rim of the wheel, and the wheel is rotated to enable ultrasonic inspection through 360 degrees of rotation. The ultrasonic equipment is retracted and the wheel is stopped and lowered to the conveyor line.

---

The present invention relates generally to inspection of metal wheels and the like to detect flaws therein.

The invention relates more particularly to non-destructive automatic ultrasonic inspection system to inspect railroad wheels.

The present invention contemplates installation of inspection equipment of the character described in an indexing wheel inspection line preferably at an existing station therein.

Heretofore various tests and testing methods have been applied to railroad wheels and it is a primary object of the present invention to utilize an improved inspection technique and system which can be installed in existing insepection lines without any substantial modification being necessitated in the existing test line.

An additional object of the present invention is to provide an automatic ultrasonic inspection system to ultrasonically inspect the major portions of railroad wheels in an inspection line at a station therein without interfering with the construction or operation of existing inspection lines.

A further object of the present invention is to provide at a former air blasting station in an indexing wheel inspection line, means whereby when a wheel stops at the inspection station a turntable is automatically actuated to raise the wheel from the conveyor of the system; automatically centering the wheel on the turntable at its uppermost position; automatically position a portion of an ultrasonic test system including a transducer and squirter assembly; automatically initiate rotation of the turntable; ultrasonically inspect the wheel rim from the bottom and side thereof through at least 360° of rotation; automatically retract the ultrasonic inspection equipment; automatically stop and lower the turntable to thereby lower the wheel onto the conveyor with all operations being completed within a normal stop cycle period of the indexing and periodically moving conveyor in the inspection line.

Additional objects and advantages of the present invention will be more readily apparent from the following detailed description of an embodiment thereof when taken together with the accompanying drawing in which:

FIG. 1 is an elevational view of a station in a railroad wheel inspection line where the present invention is incorporated therein;

FIG. 2 is a plan top view of the mechanism of FIG. 1;

FIG. 3 is a schematic view of wheel centering means for centering the wheel on the turntable for proper testing thereof; and FIG. 4 is a schematic view partially in section showing positioning of ultrasonic transducer elements in the ultrasonic testing system.

The broad concept and purposes of the present invention will be readily apparent from the foregoing set forth objects and advantages.

Referring now in more detail to the accompanying drawings showing an embodiment of the invention an existing wheel inspection line includes stands 10, supporting vertically arranged channels 12 on which are mounted inverted channels 14, which serve as supports for wheel conveyor means generally designated 16. As contemplated by the invention, but not limited thereto, this position or station in the existing inspection line can replace a former existing air blasting station.

Under normal operating conditions the conveyor system for the wheels is so indexed and timed as to stop at the various work stations for a short interval of time, in the nature of for example 35 seconds, and then movement is again initiated so as to remove a wheel from one station and index it to a subsequent station while moving a second or following wheel into the first mentioned station. The present invention recognizes and incorporates this brief time interval and readily functions within the elapsed station stop time so as not to interfere with the existing inspection line operation.

A railroad wheel is shown in the drawings at 18 and normally adapted to be carried by the members 16 through the system. At the selected position or station where the present invention is incorporated there is provided a pneumatic cylinder 20 with a turntable shaft 22 operably mounted thereby with a suitable pneumatic lead line 24 operatively connected into cylinder 20 and to a suitable source of air or other medium under pressure operable to raise the shaft 22.

The upper end of shaft 22 has connected thereon a turntable 26 which has as its function to support and raise a wheel 18 from the conveyor system to an elevated position. A turning mechanism 28 of a suitable character is operable to rotate shaft 22 and therethrough turntable 26 when shaft 22 is in its uppermost position to thereby rotate wheel 18.

During normal operation the conveyor system will stop at the station which will then automatically initiate raising of shaft 22 and turntable 26, both of which are located between the runs of the conveyor to thereby raise the wheel off of the conveyor system.

When the turntable and wheel carried thereby have reached their uppermost position then a plurality of wheel positioning devices generally designated 30 are actuated to center the wheel on the turntable. The wheel centering mechanism includes a plurality, and as shown three in number, combination air and hydraulic cylinders 32 carried by a circular support 34 which in turn are mounted on stationary stands 36 by means of triangularly interconnected beams 38.

FIG. 3 schematically depicts the wheel centering device and as shown the cylinders 32 have air chambers 32a and hydraulic fluid compartments 32b; pistons 40a and 40b are respectively mounted in chambers 32a and 32b. A suitable source of air under pressure is introduced into chambers 32a through air line 42 to thereupon act upon pistons 40a which moves piston rod 44 forwardly carrying therewith piston 40b. The hydraulic chambers 32b are interconnected in a closed loop hydraulic circuit generally designated 46 which insures equalization of pressures from each of the rods 44 against the wheel through shoes 48 or the like mounted on the ends of the rods. Upon actuation of the centering device the wheel will be centered on the turntable 26 for the express purpose of distance control between ultrasonic testing equipment and the wheel being tested.

The means for ultrasonically testing the wheel constitutes a pulse ultrasonic testing instrument designed to investigate metals and other materials in order to disclose the presence, location and size of internal discontinuites or flaws. Several such devices are available and one such instrument is manufactured by The Budd Company under the trademark Immerscope. The circuitry of such a mechanism as the Immerscope has been omitted from the present invention as being unnecessary to an understanding thereof. In order however to transmit ultrasonic sound waves or pulses into the material under test and to thereafter receive back echo pulses from the back surface of the piece or from flaws in the metal, mechanism as shown in FIGS. 1 and 3 is utilized. A stand 50 is mounted for supporting the inspection mechanism, and includes a shaft 52 upon which is adjustably mounted a bracket 54, which can be secured in place by means of hand screws 56 or the like for forward and backward adjustment of a transducer holder 58, and as will be apparent the initial position of the holder can be adjusted as indicated by arrows in FIG. 1 vertically and horizontally to position the transducer holder with respect to the wheel. A pneumatic cylinder 60 is coupled to a shaft 62 which is adjustable in the bracket 54 and has a piston rod 64 extending therefrom at the end of which is supported the transducer holder 58. The pneumatic cylinder is actuable automatically to advance or retract the transducer holder when the wheel has been lifted by the table 26 into the position shown in FIG. 1. The transducer holder has a bank of vertically arranged ultrasonic transducers as indicated at 66 and a horizontally arranged bank at 68 actuable to give substantially complete coverage of inspection to that portion of the wheel it is desired to test. Leads 70 interconnect the individual transducers to the testing instrument or Immerscope as used in this example as schematically shown in FIG. 4 of the drawings. The transducer holders are so arranged and constructed that water can either enter therein or be directed therefrom so as to form a squirter assembly in conjunction with the various transducers to impinge water jets on the sides and bottom surfaces and to serve as a medium for coupling the ultrasonic sound from the transducers into the material under test without the necessity of mechanical contact between the transducers and the test surface. Water lines are generally designated at 72 and serve to carry water to the various jets. Details of the water squirter and transducer combination will not be described in detail herein but one example of the same will be found in U.S. Patent No. 2,751,783.

After adjustment of the transducer head or holder the table 26 is rotated and an ultrasonic testing thereafter is effected through at least 360°. The use of the immersed transducer technique removes problems which might otherwise occur due to the sensitivity of transducers to contact pressure. The multiple transducers are used to provide improved near surface resolution over that obtained with a single large transducer.

In lieu of the transducer-water jet assembly, it is possible if desired and within the purview of the desired results, to utilize contact or mechanically coupled type transducers and also an ultrasonic transducer wheel can be utilized both of which are known in the art.

A spray marker 74 is actuable by a testing device to spray an area having a flaw therein to thereby mark the position for rejection or further investigation of the piece.

Subsequent to such testing the transducer holders are retracted, the table 26 is stopped from turning and retracted to a downward position whereupon the wheel 18 is replaced on wheel support means 16 for subsequent conveying to a further work station. In actual practice the stop and test period has found to require 35 seconds or less.

The water lines 72 indirectly receive water from water pan 76, which also serves as a drip pan, and a line 78 from the pan 76 leads to a water pumping and filtering system, to recirculate water into lines 72 under sufficient pressure for the jets.

Each step in the foregoing described operation is controllable by means of limit switches and interlocks, which will prevent any operation from occurring at an improper time. The turntable lift operation, and others, can be interlocked readily with the conveyor system to prevent any inadvertent movement or initiation of action of various operations on the device.

From the foregoing description and accompanying drawings the construction and operation of the present invention will be readily understood. Manifestly minor changes in details of construction and operation can be effected within the spirit and scope of the present invention, as defined in and limited solely by the appended claims.

What we claim is:

1. A system for an ultrasonic railroad wheel inspection, comprising a vertically movable turntable adapted to support and elevate a wheel; wheel centering means operable after elevation of said turntable and wheel thereon to center the wheel on the turntable, said wheel centering means comprising a plurality of composite chamber air and liquid cylinders spaced around the periphery of the wheel in elevated position, means for introducing air into the air compartments of the cylinders to move a piston and rod therein, and a closed circuit interconnecting the liquid compartments of the cylinders and assuring equal movement of cylinder rods therein for positive centering of the wheel; means operable after centering the wheel to rotate said turntable and wheel thereon; an ultrasonic flaw detection system including one or more ultrasonic transducers movably mounted for positioning in proximity to an elevated wheel, operable for transmitting ultrasonic pulses into the wheel during rotation thereof and receiving reflected pulses from the surfaces of the wheel or flaws therein for translation to a flaw detection device in the system, and means operable following the test to retract the transducers, stop rotation of and retract said turntable and wheel thereon to a non-elevated position.

2. An inspection system as claimed in claim 1, said detection system including ultrasonic transducers vertically and horizontally adjustably mounted.

3. An inspection system as claimed in claim 2, said detection system including a plurality of transducers vertically and horizontally mounted and arranged in adjacently positioned banks.

4. An inspection system as claimed in claim 1, wherein the liquid consists of hydraulic oil fluid.

References Cited

UNITED STATES PATENTS

| | | | |
|---|---|---|---|
| 2,988,218 | 6/1961 | Fedorchak et al. | 209—88 |
| 3,266,300 | 8/1966 | Graboski | 73—67.8 XR |

RICHARD C. QUEISSER, *Primary Examiner.*

JOHN R. FLANAGAN, *Assistant Examiner.*